No. 794,424. PATENTED JULY 11, 1905.
C. J. PETIT.
AIR TIGHT DOOR SILL.
APPLICATION FILED APR. 12, 1904.
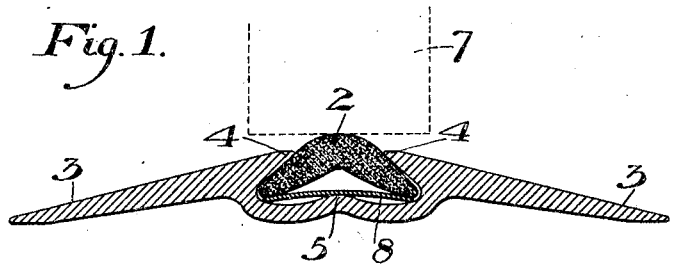
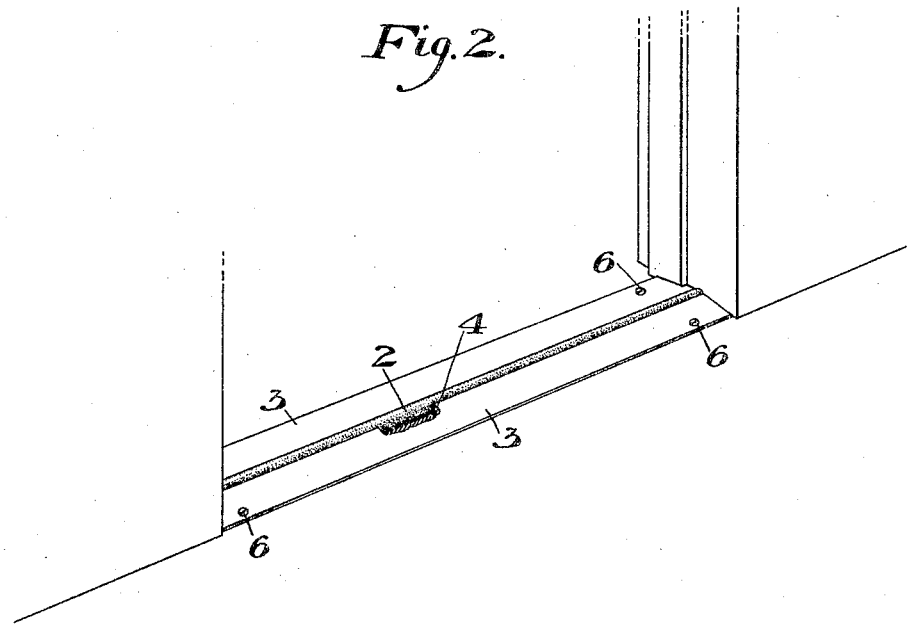
WITNESSES
INVENTOR No. 794,424. Patented July 11, 1905.

UNITED STATES PATENT OFFICE.

CLIFTON J. PETIT, OF McKEESPORT, PENNSYLVANIA, ASSIGNOR TO FOLLANSBEE BROTHERS COMPANY, OF PITTSBURG, PENNSYLVANIA, A CORPORATION OF PENNSYLVANIA.

AIR-TIGHT DOOR-SILL.

SPECIFICATION forming part of Letters Patent No. 794,424, dated July 11, 1905.

Application filed April 12, 1904. Serial No. 202,768.

*To all whom it may concern:*

Be it known that I, CLIFTON J. PETIT, of McKeesport, Allegheny county, Pennsylvania, have invented a new and useful Air-Tight Door-Sill, of which the following is a full, clear, and exact description, reference being had to the accompanying drawings, forming part of this specification, in which—

Figure 1 is a transverse section, on an enlarged scale, showing my improved door-sill; and Fig. 2 is a perspective view showing the sill in place.

My invention relates to air-tight door-sills, and is designed to provide a simple and effective construction in which the rubber strip can be readily inserted after the holding-strip has been fastened in place. It is further designed to provide for adjusting the height of the upper surface of the rubber strip to fit the lower edge of the door and to prevent cutting of the rubber when the door is opened and closed.

In the drawings, 2 represents the rubber strip, which is thicker at the middle than at the lateral edges, and its upper surface is convex and its lower surface is concave. The strip is preferably slightly thicker at the middle than in its side portions and depressed down from the center in each direction toward the edges, as shown in Fig. 1.

The holding-strip may be of any suitable form, and I have shown it as consisting of a drawn-brass strip having side flanges 3 3 and a receiving-groove at the center in which the faces 4 4 fit upon the upper sides of the rubber strip, while the lower face of the groove is preferably curved upwardly at 5, but on a curve of different radius than the lower face of the rubber strip, so that a space is left between the lower face of the strip and the floor of the groove. The inclosing strip is preferably secured to the threshold by means of suitable screws 6 6, and the rubber strip is then inserted by pressing it sidewise and pushing it down into the undercut groove. It then expands within the groove and its upper yielding surface contacts with the lower edge of the door 7 in opening and closing. The resilient strip bears at the edges on the base of the holding-groove, but is free at the side.

In order to provide for neat fitting against the lower edge of the door, I provide for adjusting the upper face of the rubber strip by inserting liners 8 in the groove of the holding-strip and below the rubber. The upper face of the rubber may thus be adjusted so that it will properly fill the gap between the door and the holding-strip and effectually seal it.

The advantages of my invention result from the peculiar form of the rubber which fits in the undercut recess, this rubber having a continuously-curved upper surface free from channels or recesses and is not cut by the pressure exerted during the moving of the door. The heart shape enables it to be easily compressed and pushed down into the groove after the holding-strip has been secured in place.

Changes may be made in the form and arrangement of the holding-strip and the rubber strip without departing from my invention.

I claim—

1. The combination with a base or holding strip having a longitudinal undercut recess formed by overhanging walls, of a resilient packing-strip thickened in the middle and tapering to the side edge portions which are sprung in under the overhanging walls of the undercut recess, the inner and outer surfaces of the overhanging walls converging entirely above the upper surface of the packing-strip, and merging without substantial angles into the transverse line of the outer surface of the projecting portion of the packing-strip; substantially as described.

2. The combination with a base or holding strip having a longitudinal undercut recess formed by overhanging walls, of a resilient packing-strip thickened in the middle and tapering to the side edge portions which are sprung in under the overhanging walls of the undercut recess with the major portion of its upper surface hidden by the walls, the inner and outer surfaces of the overhanging walls converging entirely above the upper surface of the packing-strip, and merging without substantial angles into the transverse line of the outer surface of the projecting portion of the packing-strip; substantially as described.

3. The combination with a base or holding strip having a longitudinal undercut recess formed by overhanging walls, of a resilient packing-strip thickened in the middle and tapering to the side edge portions which are sprung in under the overhanging walls of the undercut recess, the inner and outer surfaces of the overhanging walls converging entirely above the upper surface of the packing-strip, and merging without substantial angles into the transverse line of the outer surface of the projecting portion of the packing-strip, the undercut recess having a metallic liner in its bottom and on which the packing-strip rests; substantially as described.

In testimony whereof I have hereunto set my hand.

CLIFTON J. PETIT.

Witnesses:
C. S. BYRNES,
H. M. CORWIN.